(12) United States Patent
Kang et al.

(10) Patent No.: US 7,724,340 B2
(45) Date of Patent: May 25, 2010

(54) LIQUID CRYSTAL DISPLAY PANEL HAVING POWER SUPPLY LINES AND LIQUID CRYSTAL DISPLAY

(75) Inventors: Byeong Soo Kang, Cheonan-Si (KR); Seung Jae Kang, Cheonan-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 160 days.

(21) Appl. No.: 11/928,343

(22) Filed: Oct. 30, 2007

(65) Prior Publication Data

US 2008/0174731 A1 Jul. 24, 2008

(30) Foreign Application Priority Data

Jan. 18, 2007 (KR) ............. 10-2007-0005789

(51) Int. Cl.
*G02F 1/1345* (2006.01)
(52) U.S. Cl. .................. 349/150; 349/149
(58) Field of Classification Search ............ None
See application file for complete search history.

(56) References Cited

U.S. PATENT DOCUMENTS

| | | | |
|---|---|---|---|
| 2002/0093616 A1 | 7/2002 | Park et al. | |
| 2002/0140654 A1* | 10/2002 | Kim et al. | 345/87 |
| 2003/0117356 A1 | 6/2003 | Moon et al. | |
| 2004/0017535 A1 | 1/2004 | Ko et al. | |
| 2005/0179850 A1* | 8/2005 | Du | 349/150 |
| 2005/0190175 A1 | 9/2005 | Kim et al. | |
| 2005/0190333 A1* | 9/2005 | Wu et al. | 349/150 |
| 2006/0071923 A1* | 4/2006 | Lee et al. | 345/204 |
| 2006/0220991 A1* | 10/2006 | Lee et al. | 345/52 |
| 2006/0227093 A1* | 10/2006 | Jang et al. | 345/100 |
| 2007/0128922 A1* | 6/2007 | Lee | 439/493 |
| 2007/0297188 A1* | 12/2007 | Chu | 362/555 |
| 2008/0030651 A1* | 2/2008 | Shibata | 349/65 |
| 2008/0074902 A1* | 3/2008 | Oh et al. | 362/612 |

FOREIGN PATENT DOCUMENTS

| | | | |
|---|---|---|---|
| JP | 9244015 | | 9/1997 |
| JP | 2000250031 | | 9/2000 |
| JP | 2001154191 | | 6/2001 |
| JP | 2002182205 | | 6/2002 |
| JP | 2003057627 | | 2/2003 |
| JP | 2006-184352 A | * | 7/2006 |
| JP | 2006243242 | | 9/2006 |
| KR | 1020000066493 | | 11/2000 |

(Continued)

*Primary Examiner*—Mike Stahl
(74) *Attorney, Agent, or Firm*—F. Chau & Associates, LLC

(57) ABSTRACT

A liquid crystal display panel including power supply lines and a liquid crystal display including the liquid crystal display panel. A liquid crystal display panel includes a first substrate including a plurality of gate lines, and a plurality of data lines that are formed so as to intersect the plurality of gate lines, a second substrate that faces the first substrate and includes a plurality of color filters, a power supply unit that supplies power to a light source, power supply lines that are formed on the first substrate so as to be electrically connected to the power supply units, and a flexible printed circuit board that is electrically connected to the power supply lines.

18 Claims, 7 Drawing Sheets

FOREIGN PATENT DOCUMENTS

| | | |
|---|---|---|
| KR | 1020040004856 | 1/2004 |
| KR | 1020040095764 | 11/2004 |
| KR | 1020050013681 | 2/2005 |
| KR | 1020050015044 | 2/2005 |
| KR | 1020050015803 | 2/2005 |

* cited by examiner

LIQUID CRYSTAL DISPLAY PANEL HAVING POWER SUPPLY LINES AND LIQUID CRYSTAL DISPLAY

CROSS REFERENCE TO RELATED APPLICATION

This application claims priority from Korean Patent Application No. 10-2007-0005789 filed on Jan. 18, 2007, the disclosure of which is incorporated herein by reference in its entirety.

BACKGROUND OF THE INVENTION

1. Technical Field

The present invention relates to a liquid crystal display panel having power supply lines and, more specifically, to a liquid crystal display panel having power supply lines formed on a substrate to supply power to a light source and to a liquid crystal display including the liquid crystal display panel.

2. Discussion of the Related Art

Lamp types of line light sources, such as a cold cathode fluorescent lamp and an external electrode fluorescent lamp, have been used for backlight units for notebook computers. A reflecting plate is used with the lamp type of line light source, and the thickness of an optical waveguide corresponding to the thickness of the lamp is used, which results in an increase in the thickness and weight of a module. In addition, a high voltage induction inverter is used to turn on the lamp, resulting in an increase in power consumption.

Therefore, in order to avoid factors such as increased thickness, weight and power consumption, backlight units using light emitting diodes as light sources have been used. The use of the light emitting diode in the backlight unit makes it possible to reduce the thickness and power consumption of the backlight unit and to improve the brightness and color reproducibility.

In general, in the backlight unit using the light emitting diode, a data driver and a light source of the backlight unit are arranged opposite to each other with a liquid crystal display panel interposed therebetween, and the data driver is bent toward the rear side of the liquid crystal display panel. In this case, a flexible printed circuit board is used to connect the light source and a power supply mounted on a printed circuit board of the data driver in order to supply power to the light source unit. However, since the printed circuit board of the data driver is far from the light source unit, a flexible printed circuit board having a large length is needed, which results in an increase in the manufacturing costs of the flexible printed circuit board. In addition, the flexible printed circuit board having a large length may not be taut and may be bent.

SUMMARY OF THE INVENTION

Embodiments of the invention to provide a liquid crystal panel having power supply lines formed on a substrate to supply power to a backlight unit and a liquid crystal display including the liquid crystal display panel.

According to an embodiment of the invention, a liquid crystal display panel includes a first substrate including a plurality of gate lines, a plurality of data lines that are formed so as to intersect the plurality of gate lines while being insulated therefrom, and a plurality of pixels that are formed between the plurality of gate lines and the plurality of data lines, a second substrate that faces the first substrate and includes a plurality of color filters, a power supply unit that supplies power to a light source, power supply lines that are formed on the first substrate so as to be electrically connected to the power supply unit, and a flexible printed circuit board that is electrically connected to the power supply lines.

The liquid crystal display panel may further include a data driver that applies data signals to the plurality of data lines, and a gate driver that applies gate signals to the plurality of gate lines.

The liquid crystal display panel may further include a connector that is formed at one end of the flexible printed circuit board.

The data driver may include a data driving IC that generates data signals, a printed circuit board having the power supply unit mounted thereon, and a film that electrically connects the printed circuit board and the first substrate and has the data driving IC mounted thereon.

The data driver may be arranged on a first side of the first substrate, and the gate driver is arranged on a second side of the first substrate adjacent to the first side.

The power supply lines may be formed on the first substrate along the second side.

The power supply lines may be formed on the first substrate along a third side opposite to the second side.

The power supply lines may be formed on the first substrate along the second side and a third side opposite to the second side.

The liquid crystal display panel may comprise another flexible printed circuit in addition to the flexible printed circuit board, wherein the flexible printed circuit board is connected to the power supply lines formed on the first substrate along the second side and the other flexible printed circuit board is connected to the power supply lines along the third side.

The gate driver may include a gate driving IC that generates gate signals.

The gate driver may further include a film having the gate driving IC mounted thereon, and the film may be arranged on the first substrate.

The liquid crystal display panel may further include control signal lines that are formed on the first substrate and through which control signals required to operate the gate driving IC are supplied.

The liquid crystal display panel may further include first connection lines that are formed on the second film and electrically connect the power supply lines to the gate driving IC, and second connection lines that are formed on the second film and electrically connect the control signal lines to the gate driving IC.

The gate driver may be formed on the first substrate, and include a shift register composed of a plurality of stages for outputting the gate signals.

According to embodiment of the invention, a liquid crystal display includes a liquid crystal display panel including a first substrate having a plurality of gate lines, a plurality of data lines that are formed so as to intersect the plurality of gate lines while being insulated therefrom, and a plurality of pixels that are formed between the plurality of gate lines and the plurality of data lines, a second substrate that faces the first substrate and includes a plurality of color filters, a power supply unit, power supply lines that are formed on the first substrate so as to be electrically connected to the power supply unit, and a first flexible printed circuit board that is electrically connected to the power supply lines. The liquid crystal display further includes a backlight unit including a light emitting diode and a second flexible printed circuit board having the light emitting diode mounted thereon, the second flexible printed circuit board being electrically connected to the first flexible printed circuit board, wherein the power supply unit supplies power to the light emitting diode.

The liquid crystal display may further include a data driver that applies data signals to the plurality of data lines, and a gate driver that applies gate signals to the plurality of gate lines.

The liquid crystal display may further include a first connector that is formed at an end of the first flexible printed circuit board, and a second connector that is formed at an end of the second flexible printed circuit board and is connected to the first connector.

The data driver may be arranged on a first side of the first substrate, and the gate driver may be arranged on a second side of the first substrate adjacent to the first side.

The power supply lines may be formed on the first substrate along the second side.

The power supply lines may be formed on the first substrate along a third side opposite to the second side.

The power supply lines may be formed on the first substrate along the second side and a third side opposite to the second side.

The backlight unit may be arranged on a fourth side of the first substrate opposite to the first side.

BRIEF DESCRIPTION OF THE DRAWINGS

Embodiments of the present invention can be understood in more detail from the following descriptions taken in conjunction with the attached drawings in which.

DESCRIPTION OF EXEMPLARY EMBODIMENTS

Exemplary embodiments of the invention are described in detail hereafter with reference to accompanying drawings. The present invention, however, is not limited to the embodiments described herein, but may be modified in a variety of ways without departing from the scope and spirit of the invention.

Figure 1:
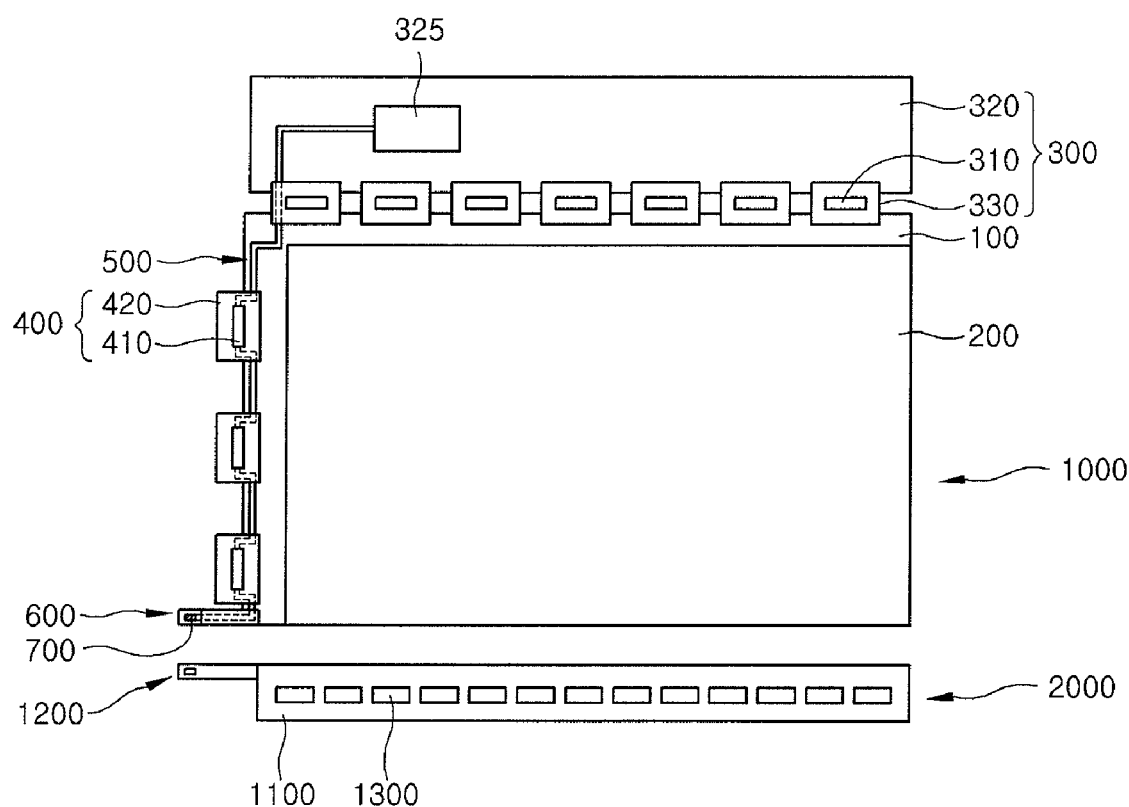
FIG. 1 is a diagram schematically illustrating the structure of a liquid crystal display according to an embodiment of the invention.

FIG. 1 is a diagram schematically illustrating the structure of a liquid crystal display according to an embodiment of the invention.

Referring to FIG. 1, a liquid crystal display panel 1000 includes a thin film transistor (TFT) substrate 100, a color filter substrate 200, a data driver 300, a gate driver 400, power supply lines 500, a first flexible printed circuit board 600, and a first connector 700. A backlight unit 2000 provided on one side of the liquid crystal display panel 1000 includes a second flexible printed circuit board 1100, a second connector 1200, and light emitting diodes 1300.

The liquid crystal display panel 1000 includes the TFT substrate 100, which is a lower substrate, the color filter substrate 200, which is an upper substrate positioned opposite the TFT substrate 100, and a liquid crystal layer (not shown) that is interposed between the two substrates and contains liquid crystal molecules aligned in a predetermined direction with respect to the two substrates.

The TFT substrate 100 includes a plurality of gate lines (not shown) formed in a first direction, for example, in a horizontal direction, a plurality of data lines (not shown) that are formed so as to intersect the gate lines, while being insulated therefrom, and a plurality of pixels (not shown) formed between the plurality of gate lines and the plurality of data lines. Each of the unit pixels includes a switching element, that is, a TFT, a pixel electrode, and a storage capacitor electrode. The TFT allows a data signal supplied to the data line to be charged to the pixel electrode in response to a gate signal supplied to the gate line.

The color filter substrate 200 includes a black matrix (not shown) for preventing light leakage and light interference between adjacent pixels, red, green, and blue color filters (not shown), and a common electrode (not shown) formed of a transparent conductive material.

The data driver 300 applies predetermined data signals to the data lines, and the gate driver 400 applies predetermined gate signals to the gate lines.

In this embodiment, the data driver 300 includes a data driving IC 310 for generating data signals, a printed circuit board 320 having various circuit parts including a power supply unit 325 mounted thereon, and a first film 330 that electrically connects the printed circuit board 320 to the TFT substrate 100 and has the data driving IC 310 mounted thereon. The gate driver 400 includes a gate driving IC 410 for generating gate signals and a second film 420 that is arranged on the TFT substrate 100 and has the gate driving IC 410 mounted thereon.

The data driver 300 is arranged on the upper side of the TFT substrate, and the gate driver 400 is arranged on the left or right side of the TFT substrate (in this embodiment, on the left side of the TFT substrate).

The power supply lines 500 are formed on the TFT substrate 100 along one side thereof (in this embodiment) a left side) to supply power from the power supply unit 325 mounted on the printed circuit board 320 of the data driver 300 to the light emitting diodes 1300 of the backlight unit 2000.

One end of each of the power supply lines 500 is connected to the power supply unit 325 through a circuit pattern (not shown) formed on the printed circuit board 320, and the other end thereof is electrically connected to the first flexible printed circuit board 600. The first connector 700 is formed at the end of the first flexible printed circuit board 600.

The backlight unit 2000 is arranged on a lower side of the liquid crystal display panel 1000, that is, on the opposite side of the data driver 300. The light emitting diodes 1300 are mounted on the second flexible printed circuit board 1100.

The second flexible printed circuit board 1100 has a portion protruding from one side thereof, and the second connector 1200 is formed at the end of the protruding portion.

The first connector 700 formed at the end of the first flexible printed circuit board 600 is coupled and electrically connected to the second connector 1200 formed at the end of the protruding portion of the second flexible printed circuit board 1100. As a result, power output from the power supply unit 325 is applied to the light emitting diodes 1300 through the power supply lines 500 formed on the TFT substrate 100, the first flexible printed circuit board 600, the first connector 700, the second connector 1200, and the second flexible printed circuit board 1100.

The power supply lines formed on the TFT substrate make it possible to reduce the length of the flexible printed circuit board, as compared to the related art in which the power supply unit is connected to the backlight unit using the flexible printed circuit board. As a result, it is possible to reduce manufacturing costs of the flexible printed circuit board and prevent the flexible printed circuit board from bending or lacking tautness, which makes it possible to smoothly supply power from the power supply unit to the light emitting diodes.

Figure 2:
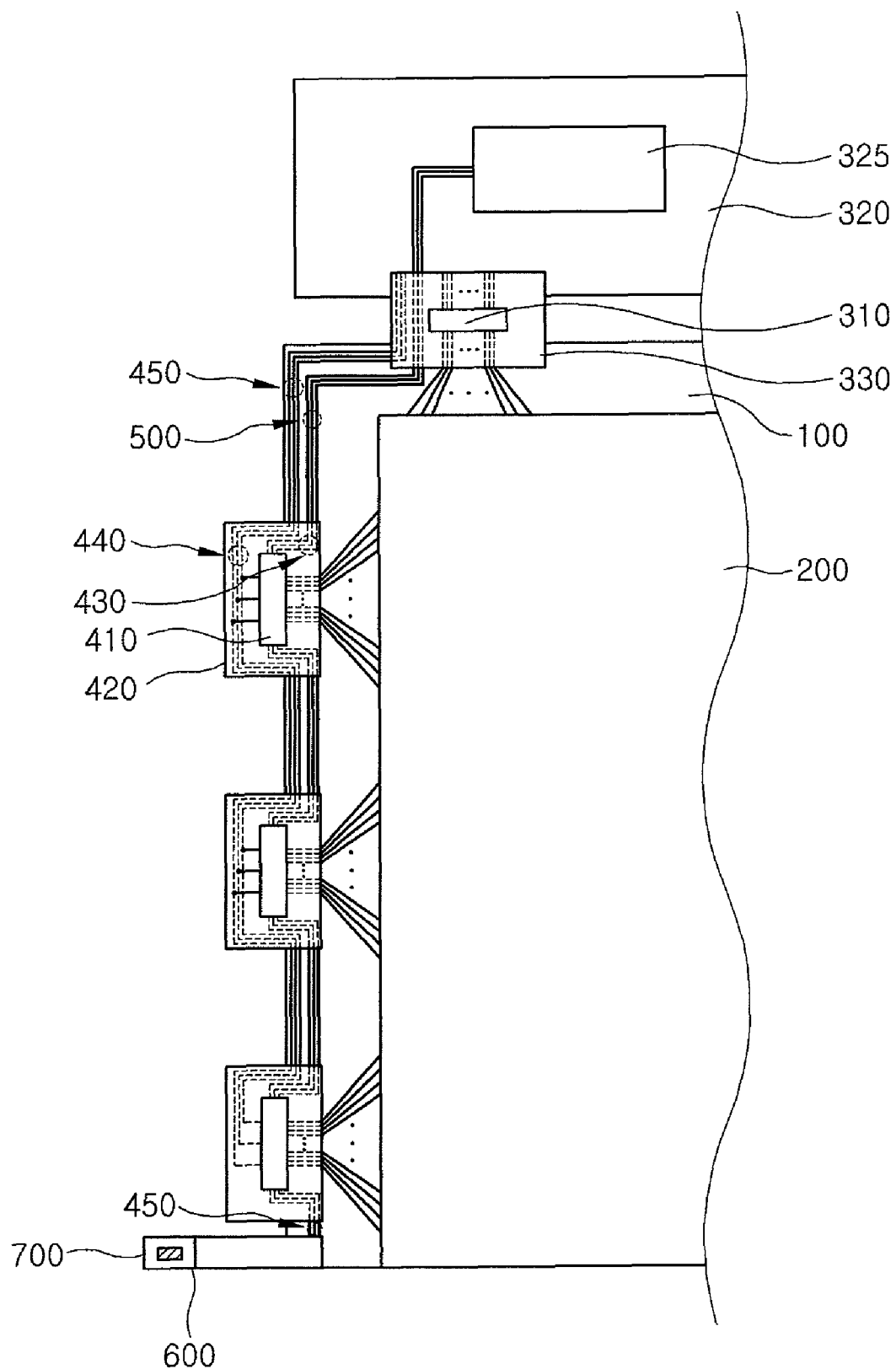
FIG. 2 is a plan view illustrating a liquid crystal display panel of the liquid crystal display shown in FIG. 1.

FIG. 2 is a plan view illustrating the liquid crystal display panel of the liquid crystal display shown in FIG. 1.

Referring to FIG. 2, the data driver 300 is arranged on the upper side of the TFT substrate, and the gate driver 400 is arranged on the left side of the TFT substrate.

In addition to the power supply unit 325 for supplying power to the light emitting diodes 1300 (see FIG. 1) of the backlight unit, various circuit parts (not shown) required to drive the liquid crystal display panel are mounted on the printed circuit board 320 of the data driver 300. For example, a timing controller that generates control signals for controlling the gate driver and the data driver and controls digital data signals input from, for example, a computer, and a gamma standard voltage generator that outputs the grayscale of the data driver as a voltage may be mounted on the printed circuit board 320 of the data driver 300.

The gate driver 400 includes the gate driving IC 410 for generating gate signals, the second film 420 having the gate driving IC 410 mounted thereon, and control signal lines 450.

The control signal lines 450 are formed on the TFT substrate 100 along one side thereof, for example, along the left side, and the power supply lines 500 are formed on the TFT substrate 100 along one side thereof, for example, the left side, to supply power from the power supply unit 325 mounted on the printed circuit board 320 of the data driver 300 to the light emitting diodes 1300 of the backlight unit 2000. In this embodiment, the power supply lines 500 are formed at a predetermined distance from the control signal lines 450.

First connection lines 430 and second connection lines 440 are formed on the second film 420 having the gate driving IC 410 mounted thereon. One end of each of the first connection lines 430 is electrically connected to the corresponding power supply line 500, and the other ends thereof are electrically connected to the gate driving IC 410. One end of each of the second connection lines 440 is electrically connected to the corresponding control signal line 450, and the other ends thereof are electrically connected to the gate driving IC 410.

According to the above-mentioned structure, power output from the power supply unit 325 is supplied to the first flexible printed circuit board 600 and the first connector 700 through a sequential path including the power supply lines 500, the first connection lines 430, the gate driving IC 410, the first connection lines 430, and the power supply lines 500 and so on, continuing based on the number gate driving ICs 410.

In this embodiment, the gate driving IC 410 is connected to the TFT substrate 100 by a COF (chip on film) technique using a film or a TCP (tape carrier package) manner, but the embodiments of the invention are not limited thereto. For example, the gate driving IC 410 may be directly mounted on the TFT substrate 100 by a COG (chip on glass) technique. When the gate driving IC 410 is mounted by the COG technique, the second film 420 and the first and second connection lines 430 and 440 may be omitted.

Figure 3A:
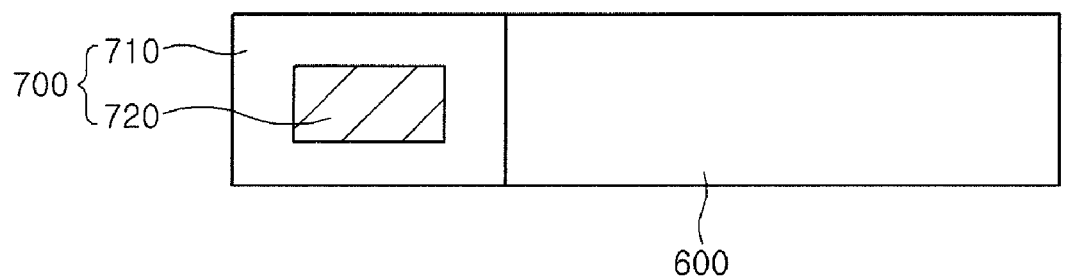
FIGS. 3A and 3B are a plan view and a side view illustrating a first flexible printed circuit board of the liquid crystal display panel, respectively according to an embodiment of the present invention.
Figure 3B:
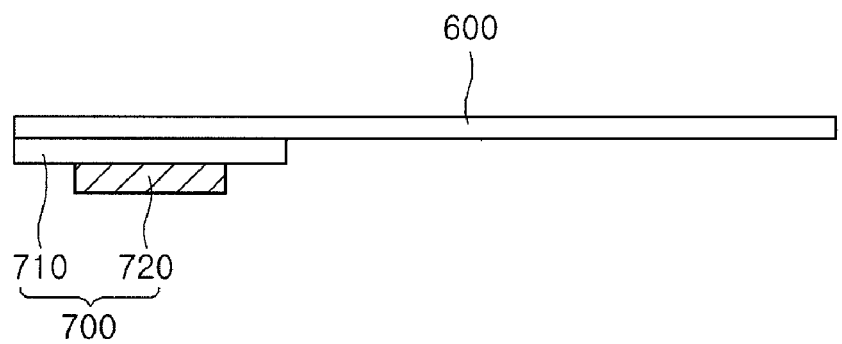
Figure 4A:
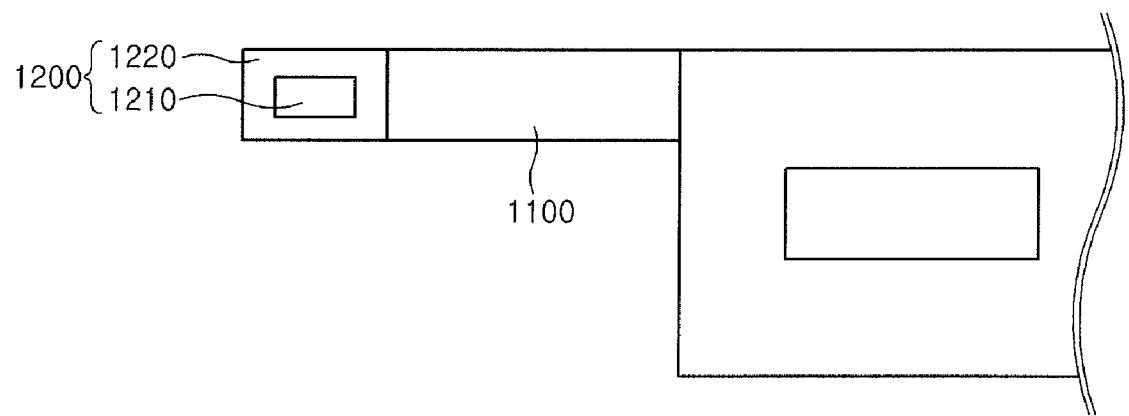
FIGS. 4A and 4B are a plan view and a side view illustrating a second flexible printed circuit board of a backlight unit, respectively according to an embodiment of the present invention.
Figure 4B:
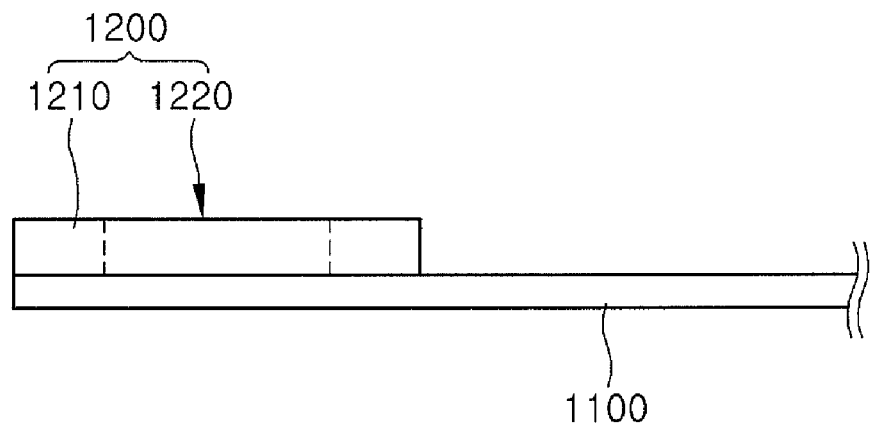
Figure 5:
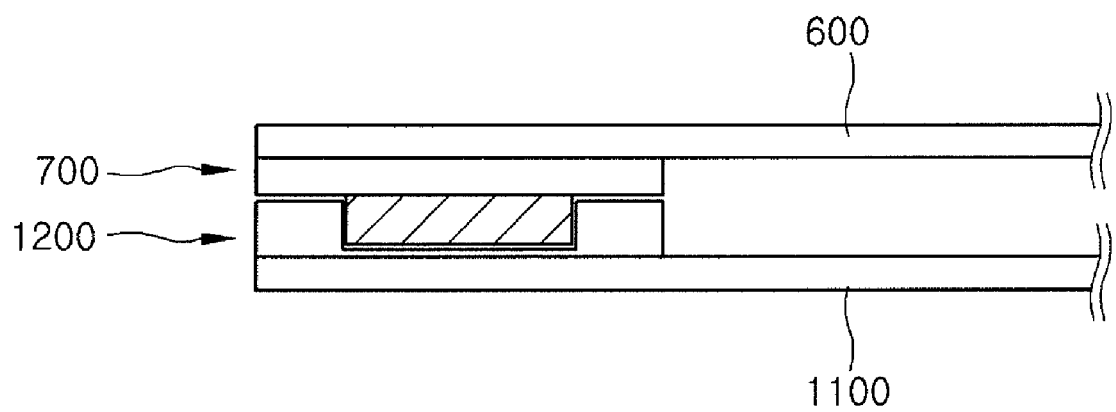
FIG. 5 is a diagram illustrating connection between a first connector and a second connector according to an embodiment of the present.

FIGS. 3A and 3B are a plan view and a side view illustrating the first flexible printed circuit board 600 of the liquid crystal display panel, respectively, and FIGS. 4A and 4B are a plan view and a side view illustrating the second flexible printed circuit board 1100 of the backlight unit, respectively. FIG. 5 is a cross-sectional view illustrating coupling between the first connector 700 and the second connector 1200.

Referring to FIGS. 3A to 5, the first connector 700 is formed on one side of the first flexible printed circuit board 600 of the liquid crystal display panel, and the second connector 1200 is formed on one side of the second flexible printed circuit board 1100 of the backlight unit.

The first connector 700 includes a first base plate 710 and a convex terminal 720 that protrudes from the first base plate 710 to a predetermined height. A circuit pattern (not shown) connected to the power supply line 500 (see FIGS. 1 and 2) is formed on the first printed circuit board 600 to be electrically connected to the convex terminal 720 through the first base plate 710.

The second connector 1200 includes a second base plate 1210 and a concave terminal 1220 that is recessed into the second base plate 1210 to a predetermined depth. The convex terminal 720 of the first connector 700 and the concave terminal 1220 of the second connector 1200 are formed so as to mate with each other, and the convex terminal 720 is coupled into the concave terminal 1220. In this embodiment, the convex terminal 720 is formed on the first connector 700, and the concave terminal 1220 is formed in the second connector 1200, but the embodiments of the invention are not limited thereto. For example, a convex terminal may be formed on the second connector 1200, and a concave terminal may be formed in the first connector 700. In addition, the fitting structure between the first connector and the second connector is not limited to the above, but various structures for connecting the first terminal to the second terminal may be used.

Figure 6:
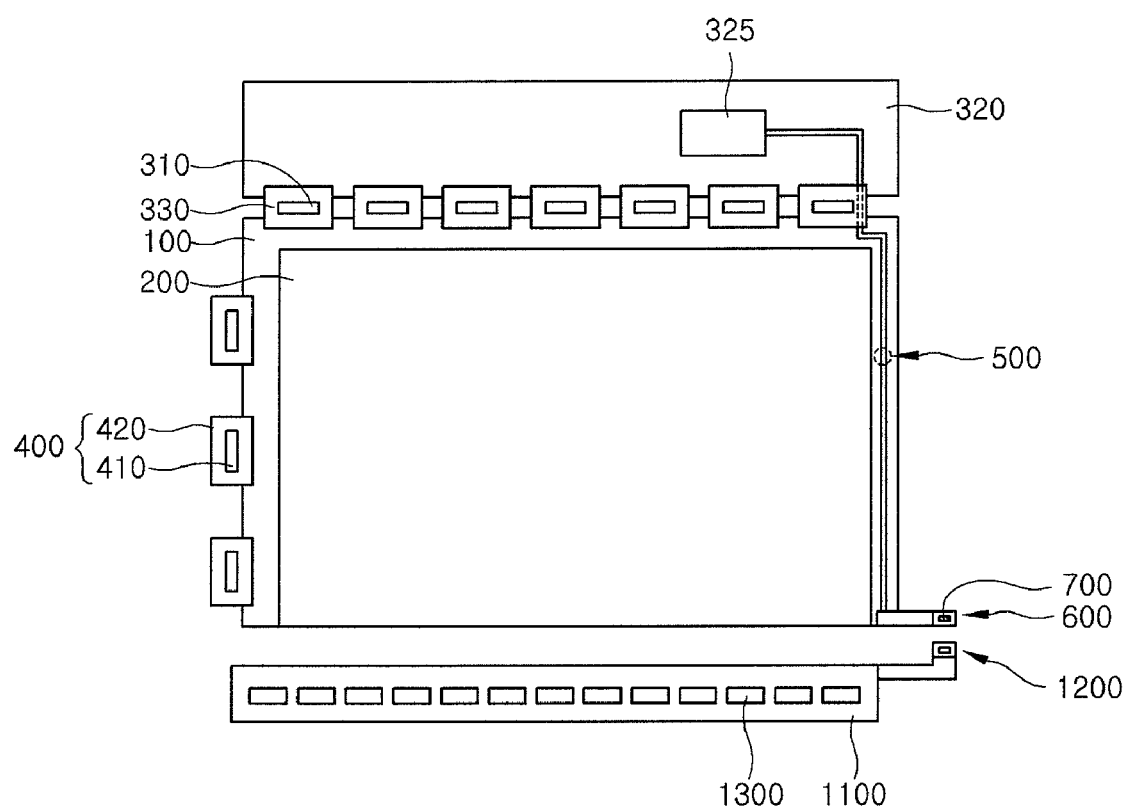
FIG. 6 is a diagram schematically illustrating the structure of a liquid crystal display according to an embodiment of the invention.

FIG. 6 is a diagram schematically illustrating the structure of a liquid crystal display according to an embodiment of the invention. The embodiment shown in FIG. 6 is substantially similar to the embodiment described in connection with FIG. 1 except for at least the positions of the power supply lines. Referring to FIG. 6, the data driver 300 is arranged on the upper side of the TFT substrate, and the gate driver 400 is arranged on the left side of the TFT substrate.

The power supply lines 500 are formed on the opposite side of the gate driver 400, that is, on the right side of the TFT substrate 100, to apply power supplied from the power supply unit 325 mounted to the printed circuit board 320 of the data driver 300 to the light emitting diodes 1300 of the backlight unit 2000.

When the power supply lines 500 are formed on the opposite side of the gate driver 400, power is supplied from the power supply unit 325 to the light emitting diodes 1300 of the backlight unit through the power supply lines 500 without passing through the gate driving IC 410.

A high voltage of, for example, about 15 to 25 V and a current of about 1.00 mA may be applied to the light emitting diodes of the backlight unit. The gate driving IC 410 may be damaged by the high voltage and current. Therefore, the power supply lines 500 formed on the opposite side of the gate driver 400 prevent malfunction of the gate driving IC due to the high voltage and current, resulting in higher reliability.

Figure 7A:
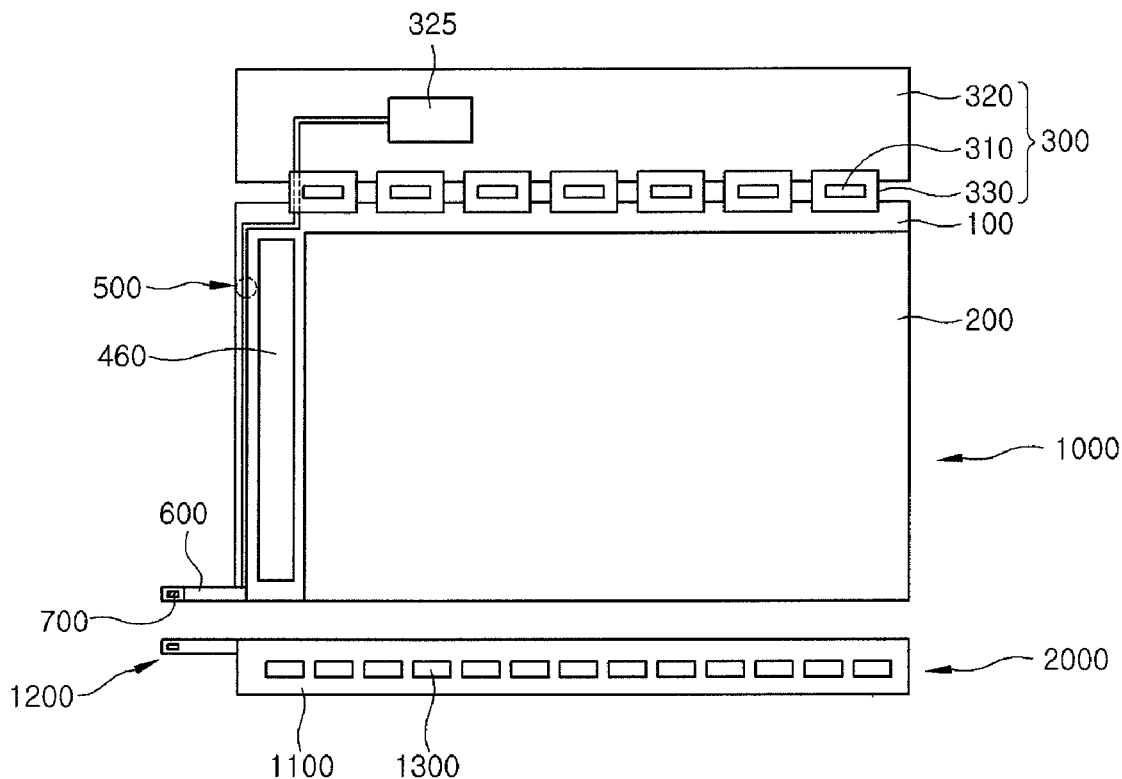
FIG. 7A is a diagram schematically illustrating the structure of a liquid crystal display according to an embodiment of the invention.
Figure 7B:
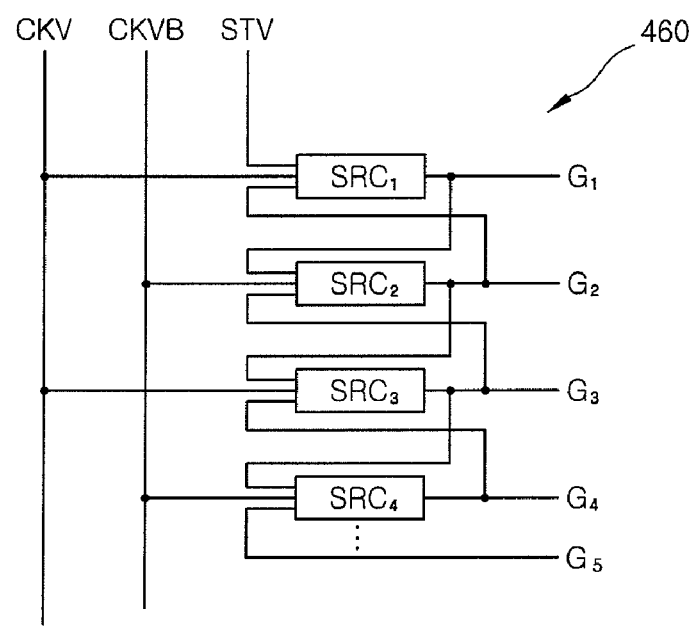
FIG. 7B is a diagram schematically illustrating the structure of a gate driver shown in FIG. 7A.

FIG. 7A is a diagram schematically illustrating the structure of a liquid crystal display according to an embodiment of the invention, and FIG. 7B is a diagram schematically illustrating the structure of a gate driver shown in FIG. 7A. The embodiment shown in FIGS. 7A and 7B is similar to the embodiments described in connection with FIGS. 1 and 6 except for at least the structure of the gate driver.

Referring to FIG. 7A, a gate driver 460 is provided on the TFT substrate 100 along one side thereof (in this embodiment, on the left side). The gate driver 460 is composed of a circuit for controlling thin film transistors, serving as switching elements for allowing external clock signals to pass through the gate lines. The thin film transistors are composed of amorphous silicon thin film transistors, and are formed on the substrate 100.

Referring to FIG. 7B, the gate driver 460 includes a shift register having a plurality of cascaded stages SRC1, SRC2, SRC3, SRC4 ... SRC$_n$ for sequentially turning on gate lines G1, G2, G3, G4 ... G$_n$, respectively, in response to a clock signal CKV and an inverted clock signal CKVB. When a start signal STV turns on the first stage SR1, the first stage turns on the first gate line G1 in response to the clock signal CKV, which causes the second stage SR2 to be turned on. Then, the second stage turns on the second gate line G2 in response to the inverted clock signal CKVB. The second gate line G2 in the on state turns on the third stage SRC3 and turns off the first stage SRC1. In this way, the gate lines are sequentially turned on. Similar to the embodiment described in connection with FIG. 6, power is supplied through the power lines 500 without passing through gate driving ICS 410.

Figure 8:
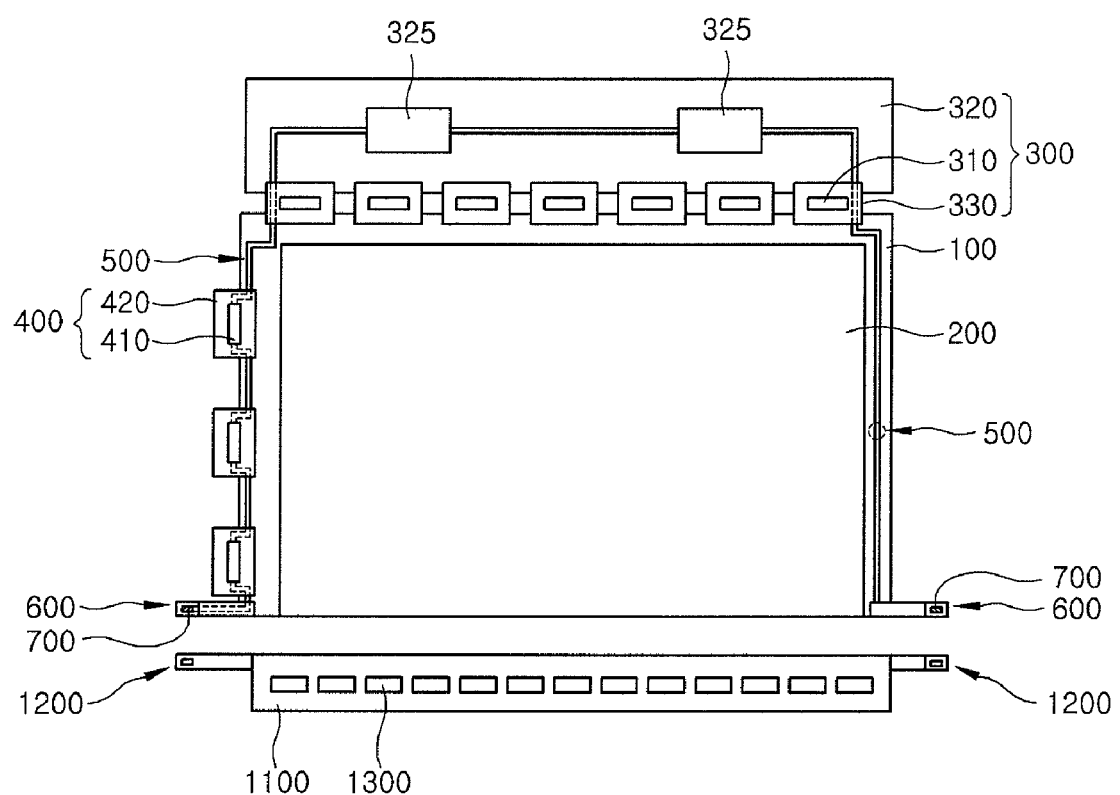
FIG. 8 is a diagram schematically illustrating the structure of a liquid crystal display according to an embodiment of the invention.

FIG. 8 is a diagram schematically illustrating the structure of a liquid crystal display according to an embodiment of the invention. The fourth embodiment shown in FIG. 8 is similar to the embodiments described in connection with FIGS. 1, 6 and 7A-7B, except for at least the number of power supply lines and the positions thereof.

Referring to FIG. 8, power supply lines 500 are formed on the TFT substrate on two sides thereof opposite to each other, that is, on the left and right sides of the TFT substrate.

The first flexible printed circuit boards 600 and the first connectors 700 are formed at ends of the power supply lines 500 formed on the left and right sides of the TFT substrate 100.

The second connectors 1200 are formed at one end and the other end of the second flexible printed circuit board 1100 of the backlight unit 2000, and the second connectors 1200 are connected to the first connectors 700.

As described above, according to the embodiments of the invention, the power supply lines are formed on the substrate to supply power to the backlight unit, and the flexible printed circuit board is connected to the power supply lines in the liquid crystal display panel, which makes it possible to reduce the length of the flexible printed circuit board to a minimum. As a result, it is possible to reduce the manufacturing costs of the flexible printed circuit board and prevent the flexible printed circuit board from being damaged.

Although exemplary embodiments of the present invention have been described herein, the invention is not limited thereto, and those skilled in the art will appreciate that various modifications, additions and substitutions are possible, without departing from the scope and spirit of the invention as hereinafter claimed.

What is claimed is:

1. A liquid crystal display panel comprising:
   a first substrate including a plurality of gate lines, and a plurality of data lines intersecting the plurality of gate lines;
   a second substrate that faces the first substrate and includes a plurality of color filters;
   a power supply unit that supplies power to a light source;
   power supply lines formed on the first substrate and electrically connected to the power supply unit;
   a flexible printed circuit board electrically connected to the power supply lines;
   a data driver that applies data signals to the plurality of data lines; and
   a gate driver that applies gate signals to the plurality of gate lines,
   wherein the data driver includes a data driving integrated circuit (IC) that generates data signals; a printed circuit board having the power supply unit mounted thereon; and a film that electrically connects the printed circuit board and the first substrate and includes the data driving IC mounted thereon.

2. The liquid crystal display panel according to claim 1, further comprising:
   a connector formed at an end of the flexible printed circuit board.

3. The liquid crystal display panel according to claim 1, wherein the data driver is arranged on a first side of the first substrate, and the gate driver is arranged on a second side of the first substrate adjacent to the first side.

4. The liquid crystal display panel according to claim 3, wherein the power supply lines are formed on the first substrate along the second side.

5. The liquid crystal display panel according to claim 3, wherein the power supply lines are formed on the first substrate along a third side opposite to the second side.

6. The liquid crystal display panel according to claim 3, wherein the power supply lines are formed on the first substrate along the second side and a third side opposite to the second side.

7. The liquid crystal display panel according to claim 6, further comprising another flexible printed circuit board,
   wherein the flexible printed circuit board is connected to the power supply lines formed on the first substrate along the second side and the other flexible printed circuit board is connected to the power supply lines formed on the first substrate along the third side.

8. The liquid crystal display panel according to claim 1, wherein the gate driver includes a gate driving integrated (IC) that generates gate signals.

9. The liquid crystal display panel according to claim 8, wherein the gate driver further includes a film having the gate driving IC mounted thereon, and the film is arranged on the first substrate.

10. The liquid crystal display panel according to claim 8, further comprising:
    control signal lines formed on the first substrate and through which control signals to operate the gate driving IC are supplied.

11. The liquid crystal display panel according to claim 9, further comprising:
    first connection lines formed on the film which has the gate driving IC mounted thereon, and electrically connecting the power supply lines to the gate driving IC.

12. The liquid crystal display panel according to claim 1, wherein the gate driver is formed on the first substrate, and includes a shift register composed of a plurality of stages for outputting the gate signals.

13. A liquid crystal display comprising:
a liquid crystal display panel including:
a first substrate having a plurality of gate lines, and a plurality of data lines intersecting the plurality of gate lines;
a second substrate that faces the first substrate and includes a plurality of color filters;
a power supply unit;
power supply lines formed on the first substrate and electrically connected to the power supply unit;
a first flexible printed circuit board electrically connected to the power supply lines;
a data driver that applies data signals to the plurality of data lines;
a gate driver that applies gate signals to the plurality of gate lines;
a backlight unit including a light emitting diode and a second flexible printed circuit board having the light emitting diode mounted thereon, the second flexible printed circuit board being electrically connected to the first flexible printed circuit board, wherein the power supply unit supplies power to the light emitting diode;
a first connector formed at an end of the first flexible printed circuit board; and
a second connector formed at an end of the second flexible printed circuit board, wherein the second connector is connected to the first connector.

14. The liquid crystal display according to claim 13, wherein the data driver is arranged on a first side of the first substrate, and the gate driver is arranged on a second side of the first substrate adjacent to the first side.

15. The liquid crystal display according to claim 14, wherein the power supply lines are formed on the first substrate along the second side.

16. The liquid crystal display according to claim 14, wherein the power supply lines are formed on the first substrate along a third side opposite to the second side.

17. The liquid crystal display according to claim 14, wherein the power supply lines are formed on the first substrate along the second side and a third side opposite to the second side.

18. The liquid crystal display according to claim 14, wherein the backlight unit is arranged on a fourth side of the first substrate opposite to the first side.

* * * * *